3,391,144
SUBSTITUTED PHENYL α-(3-GLUTAR-
IMIDYL)ACETATES
Francis Johnson, Newton Lower Falls, Mass., assignor to
The Dow Chemical Company, Midland, Mich., a corporation of Delaware
No Drawing. Original application Oct. 6, 1961, Ser. No. 144,011, now Patent No. 3,152,130, dated Oct. 6, 1964. Divided and this application Apr. 9, 1964, Ser. No. 358,604
7 Claims. (Cl. 260—281)

The present invention is directed to a process for preparing novel phenyl α-(3-glutarimidyl)acetates. This application is a division of patent application Ser. No. 144,011, filed Oct. 6, 1961, now U.S. Patent 3,152,130.

It is an object of this invention to provide a process for preparing phenyl α-(3-glutarimidyl)acetates which are novel compounds useful in the preparation of actiphenols.

I discovered that an α-(3-glutarimidyl)acetyl halide may be reacted with a phenol in the presenece of a base, to prepare a phenyl α-(3-glutarimidyl)acetate, as follows:

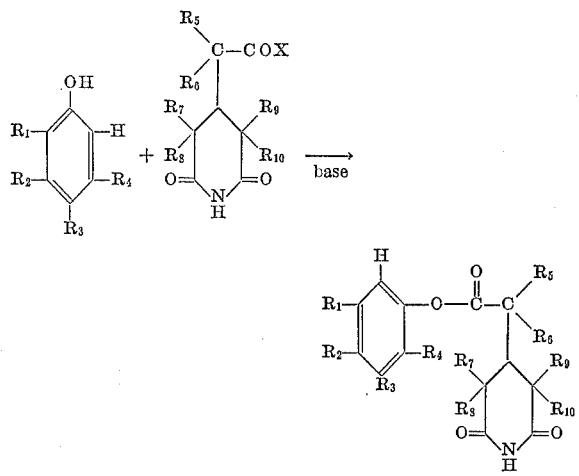

The $R_1$–$R_4$ groups represent hydrogen, lower alkyl, alkoxyl, aryloxyl, halogen (preferably chlorine or bromine), nitro, ester and ketonic groups. Adjacent groups may be fused or cyclized. The $R_5$–$R_{10}$ groups may be hydrogen or any substituting group that does not react with the reactants and products under the process conditions. They include alkyls, alkoxyls, aryls, aryloxyls, dialkylamines, etc. The preferred R groups are hydrogen, the lower alkyls and the halogens. X represents a halogen, preferably chlorine or bromine.

The α-(3-glutarimidyl)acetyl chloride reactants is easily prepared by treating the corresponding 3-carboxymethyl glutarimide with thionyl chloride. The α-(3-glutarimidyl) acetyl chloride is reacted with the phenol in the presence of a base (which acts as a scavenger for halide produced during the reaction), preferably a tertiary amine such as pyridine, to produce the corresponding phenyl α-(3-glutarimidyl)acetate. The acetate can be heated with $AlCl_3$, and then cooled and hydrolyzed, to prepare actiphenols.

For the purpose of further explaining the invention to those skilled in the art, the following illustrative examples are given.

Example 1.—2,4-dimethylphenyl α-(3-glutarimidyl) acetate

α-(3-glutarimidyl)acetyl chloride (prepared from 5 g. of acid) was added to pyridine (35 ml.). 2,4-dimethylphenol (5 g.) was added and the mixture warmed on a steam bath for 2 hours. At the end of this period the dark homogenous solution was added to methylene chloride (250 ml.) and water (250 ml.). The mixture was filtered to remove a small amount of black solid and the organic layer washed with 2 N hydrochloric acid (2×125 ml. portions). The methylene chloride abstract was then washed with water, with sodium carbonate solution and then with water, followed by drying over anhydrous magnesium sulphate. Brief boiling of this extract with charcoal followed by filtration removed most of the color associated with the liquid. The solution was then concentrated to small bulk on a water bath and other added to the point of spontaneous crystallization. Two crops of a highly crystalline white material were obtained of total weight, 6 g., M.P. 155–6° C. A sample of the material was recrystallized at 4 times and had M.P. 160°. Found: C, 65.3; H, 6.0; N, 5.3. Required for: $C_{15}H_{17}O_4N$: C, 65.44; H, 6.22; N, 5.09%.

Example 2

Following the procedure of Example 1, 3,4-dimethylphenol is used in place of the 2,4-dimethylphenol, to obtain 3,4-dimethylphenyl α-(3-glutarimidyl)acetate.

Example 3

Following the procedure of Example 1, 2,5-dimethylphenol is used in place of the 2,4-dimethylphenol, to obtain 2,5-dimethylphenyl α-(3-glutarimidyl)acetate.

Example 4

Following the procedure of Example 1, 2,4-diethylphenol is used in place of the 2,4-dimethylphenol, to obtain 2,4-diethylphenol α-(3-glutarimidyl)acetate.

Example 5

Following the procedure of Example 1, 3,4-diethylphenol is used in place of the 2,4-dimethylphenol to obtain 3,4-diethylphenyl α-(3-glutarimidyl)acetate.

Example 6

Following the procedure of Example 1, 2,5-diethylphenol is used in place of the 2,4-dimethylphenol, to obtain 2,5-diethylphenyl α-(3-glutarimidyl)acetate.

Example 7

Following the procedure of Example 1, 2-chlorophenol is used in place of the 2,4-dimethylphenol, to obtain 2-chlorophenyl α-(3-glutarimidyl)acetate.

Similarly, other phenyl α-(3-glutarimidyl) acetates are prepared from starting materials corresponding to the general definition wherein other substituent R groups on various ring carbons are varied. It appears that the substituents and side chains do not alter the condition of the reaction although the presence or absence of substituents on the ortho and para positions of the phenol influence the yield of the desired acetate.

The acetates are useful intermediates in the preparation of the actiphenols. The acetates exhibit anti-fungal activity. The acetate product of Example 1 was tested for control of tomato late blight. At 75 p.p.m., 40% control was attained and at 10 p.p.m., 20% control was attained. The actiphenols have shown themselves to have unusual biocidal activity and particularly outstanding activity as anti-fungal agents.

Although the invention has been illustrated by specific examples, it is to be understood that it includes all modifications and variations that come within the scope of the appended claims.

What is claimed is:
1. 2,4-dimethylphenyl α-(3-glutarimidyl)acetate.
2. 3,4-dimethylphenyl α-(3-glutarimidyl)acetate.
3. 2,5-dimethylphenyl α-(3-glutarimidyl)acetate.
4. 2,4-diethylphenyl α-(3-glutarimidyl)acetate.

5. 3,4-diethylphenyl α-(3-glutarimidyl)acetate.
6. 2,5-diethylphenyl α-(3-glutarimidyl)acetate.
7. 2-chlorophenyl-α-(3-glutarimidyl)acetate.

References Cited

UNITED STATES PATENTS

| | | | |
|---|---|---|---|
| 2,717,126 | 8/1955 | Mulvaney | 260—281 |
| 3,076,809 | 2/1963 | Johnson | 260—281 |
| 3,067,092 | 12/1962 | Feichtinger et al. | 167—22 |
| 3,108,036 | 10/1963 | Molvar | 167—22 |

OTHER REFERENCES

Lucas Organic Chemistry, 2nd Ed., American Book Co.

NICHOLAS S. RIZZO, *Primary Examiner.*

D. G. DAUS, *Assistant Examiner.*